R. M. CLARK.
SPRING WHEEL.
APPLICATION FILED NOV. 20, 1912.

1,103,563.

Patented July 14, 1914.

Witnesses

Inventor
R. M. Clark

UNITED STATES PATENT OFFICE.

ROSWELL M. CLARK, OF KANSAS CITY, MISSOURI.

SPRING-WHEEL.

1,103,563.          Specification of Letters Patent.     Patented July 14, 1914.

Application filed November 20, 1912. Serial No. 732,455.

*To all whom it may concern:*

Be it known that I, ROSWELL M. CLARK, a citizen of the United States, residing at Kansas City, in the county of Jackson and State of Missouri, have invented certain new and useful Improvements in Spring-Wheels, of which the following is a specification.

This invention relates to spring wheels of that class embodying an inner member, an outer member, spokes pivoted at their outer ends to the outer member and extending slidingly into the inner member and springs mounted on the spokes and arranged to normally hold the inner and outer members in concentric relation, and my object is to produce a wheel of this general character, in which the springs under normal conditions, sustain the inner member of the wheel centrally within the outer member of the wheel and in which the springs act and react against the outer member and inner member of the wheel respectively, only when the inner member occupies an eccentric relation to the outer member.

Another object is to produce a spring wheel spoke capable of being secured in or removed from position as a part of the wheel without interfering in any way with any other spoke and without affecting the compression of its own spring or the spring of any other spoke.

Another object is to provide a spring wheel having an inner and an outer member and extensible spokes equipped with springs, under compression, and means whereby the compression of the springs may be increased or diminished without affecting the inner and outer members except when the wheel is carrying an overload.

Another object is to produce means for preventing unrestrained oscillatory action of the spokes within the inner member for the purpose of preventing clicking noises while the wheel is in motion.

With these and other objects in view, as hereinafter appear, the invention consists in certain novel and peculiar features of construction and organization as hereinafter described and claimed; and in order that it may be fully understood reference is to be had to the accompanying drawing, in which—

Figure 1:
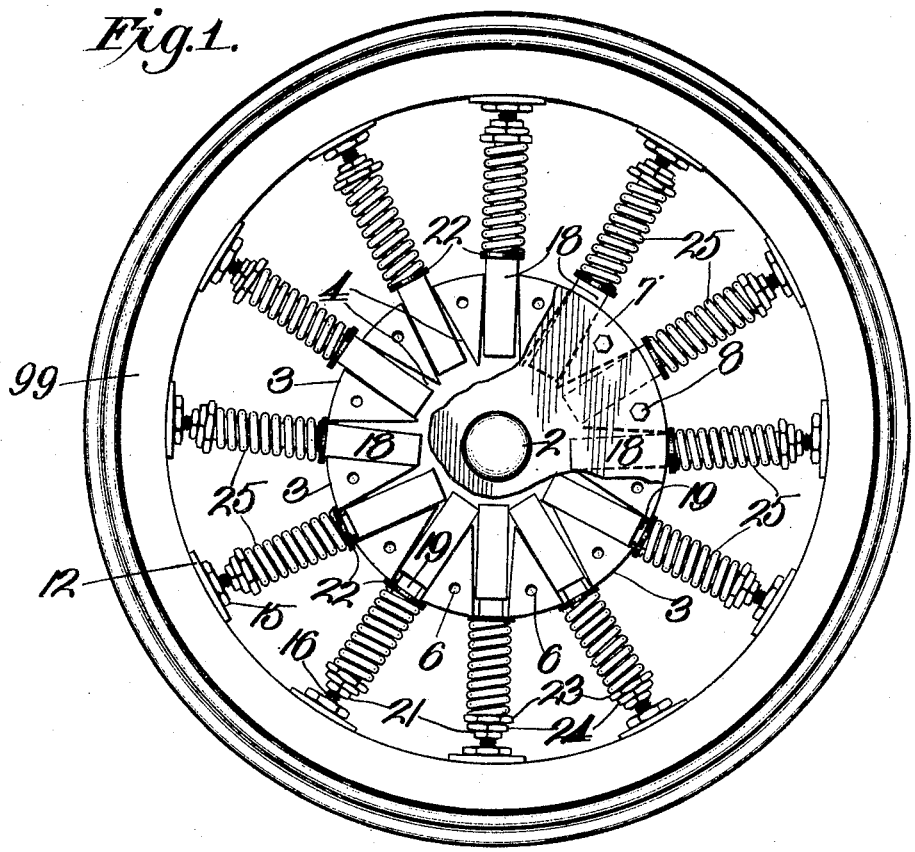
Figure 2:
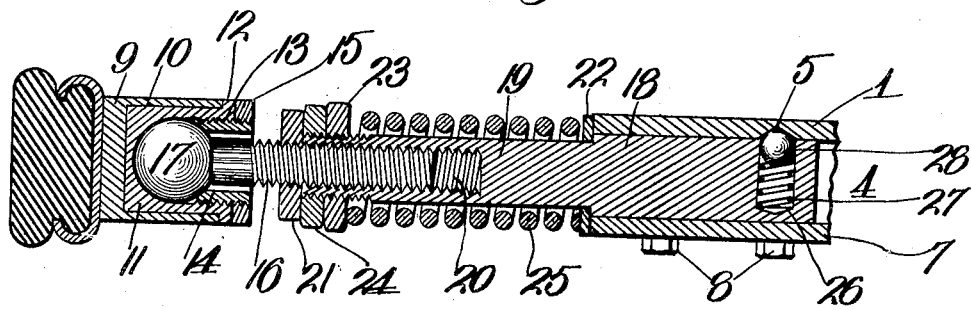

Figure 1, is a side view of a spring wheel embodying my invention with the inner member of the wheel depressed to the position it will occupy when the wheel carries its maximum load, the outer face plate of the inner member being partly broken away. Fig. 2, is an enlarged radial section taken through one of the spokes and the inner and outer members of the wheel, when the parts are in their normal positions.

In the said drawing, the inner or hub member of the wheel is constructed as follows: 1 is a circular plate through which the axle, not shown, projects in the customary manner, and 2 is the cap of the hub. The plate 1, is provided with equi-distant radial lugs 3, of isosceles triangle form and so proportioned as to provide radial openings 4, the sides of the openings formed by the sides of the triangular lugs converging outwardly. The plate or disk 1, is provided in its inner side and centrally between and near the inner ends of adjacent lugs 3, with recesses 5, and said lugs are provided with transverse holes 6. The inner member or hub, has a face-plate 7, which corresponds in form and size to the disk 1 and fits flatly against the lugs 3, and said face plate forms the outer sides of the openings 4, and is secured reliably in place by bolts 8, extending through it and into the holes 6 of the lugs 3.

9 is the outer member or rim of the wheel, provided with equidistant sockets 10 in its inner side, corresponding in number to the openings 4 in the inner member and fitting in each of said sockets is a socket-piece 11, having a marginal flange 12, fitting against the inner edge of the outer member or rim. Each socket-piece is provided centrally with threads 13, and engaging said threads is a short tubular screw 14, externally engaged by a lock-nut 15, which limits the distance which the tubular screw can enter the socket.

Each spoke consists of an inner section and an outer section the latter being in the form of a screw 16 having a spherical or rounded head 17, which head is adapted to fit into a socket-piece 11 and be secured therein by the engaging tubular screw 14. The inner section of the spoke, comprises a squared portion 18, and a cylindrical portion 19, of smaller diameter than the squared portion and provided with a threaded bore 20, receiving the bolt 16, and the latter is equipped with a lock-nut 21 to bear against the outer end of the threaded portion of the inner section of the spoke for the purpose of guarding against accidental variation in the length of the spoke.

22 is a washer fitting on the cylindrical portion 19 of each spoke, and against the outer end of the squared portion and constituting an outwardly-facing movable shoulder for the spoke, and at the outer end of said portion 19 is an inwardly-facing shoulder in the form of a nut 23 and a nut 24, the latter acting as a lock nut for the shoulder or nut 23 and being in turn restrained from turning movement by nut 21, and fitting upon the portion 19 and exerting pressure against said movable shoulder or washer and adjustable shoulder or nut 23, is a coiled spring 25.

The squared portion of each spoke fits snugly between the plates or disks 1 and 7, and also fits snugly at what may be termed its edges, against the peripheral edges of adjacent lugs 3, so as to be capable of fulcruming on either of said lugs to accommodate up and down movement of the inner member of the wheel, as will be readily seen by reference to Fig. 1, in which the inner member is shown at the maximum of its downward movement, it being understood that in the ordinary vibration of the load when the wheel is running, the inner member is never depressed to the extent shown in said figure.

In practice the springs are placed on the spokes under sufficient compression, that a plurality of them, preferably three, when underlying the axle, are capable of supporting the normal load without noticeable yielding, and the parts are so proportioned that all of the movable shoulders or washers under the normal conditions mentioned, except those sustaining the load, press lightly against the periphery of the inner member or hub of the wheel. As the inner member vibrates up and down when the wheel is running, it increases and relaxes the pressure alternately on the springs below and the springs above the plane of its axis the squared portions of the spokes at such time reciprocating as plungers in the openings 4. At the same time all of the spokes except those in the vertical plane of the axle, have slight swinging movements in the plane of the periphery of the wheel, such movements being greater as the spokes attain substantially horizontal positions, and in order to avoid the production of a clicking noise or rattle incident to this reciprocatory and slight pivotal movement of the spokes, the squared portion of each is provided in its inner side, with a pocket 26 containing an expansive coiled spring 27 and a ball 28, the latter being held by the pressure of the spring against the inner plate or disk 1, and when in normal position, said ball occupies a recess 5, the ball riding in and out of said recess through the reciprocation of the spoke.

To accommodate swinging movements of the spokes in the peripheral plane of the wheel, the openings 4 are flared at what may be termed their peripheral edges or sides, and in order to guard against such pressure on the spokes when in a substantially horizontal position as would tend to bend them through the pressure thereagainst of the outer edges of the adjacent lugs 3, the squared portions of the spokes are of such length that under the maximum load and therefore depression of the inner member of the wheel, a plurality of the spokes most directly underlying the center of the wheel will abut together as shown in Fig. 1, this abutment relieving the spokes occupying substantially horizontal positions from the imposition of the bending pressure thereon above referred to.

From the above it will be seen that the rim is never subjected to a constant pressure of all of the springs, and only at times to a pressure greater than that imposed by normal load, and that all pressure is imposed normally on that part of the rim or the outer member of the wheel which is resting upon the ground, though at times the pressure is transferred to the upper part of the rim, this being due to the fact that in running over rough roads, the load will frequently move upward until overcome by the resistance of the springs more directly overlying the plane of the axle.

When it is desired to vary the tension of the springs to accommodate heavy or light loads, the shoulders or nuts 23 are screwed farther on or off the cylindrical portions 1 of the spokes, and secured in their new positions by means of the lock nuts 21, and when it is desired to vary the length of the spokes, the outer portions thereof are screwed farther in or out of portions 19 and then the lock nuts 21 are brought to bear against the outer ends of the last-named portions, it being understood that when this adjustment takes place, the spokes are preferably removed from the wheels. This removal is accomplished by removing the face plate, then unscrewing nuts 13 and the tubular screws 14, after which there is sufficient play to permit the inner portions of the spokes to be swung out of the openings 14, and then moved endwise inward to withdraw the heads 17 from the socket pieces 11, the reverse manipulation being followed to replace the spoke. It will thus be seen that the tension on the springs does not interfere with the insertion or removal of the spokes. As before explained, when the spokes are in place and the wheel is carrying a predetermined load, the springs exert no constant outward pressure on the rim, this being desirable as I have found in actual practice that where springs are placed between the inner and outer portions of the wheel under heavy pressure, the rim, even if of steel, in time will check and crack, which is of course a dangerous condition in a wheel of any vehicle and particularly one adapted to be driven at high speed.

It will also be noted that by the construction described, in which a spring is adapted to resist the load for only a fraction of each revolution of the wheel the danger of crystallization of the springs is greatly minimized.

From the above description, it will be apparent that I have produced a spring wheel embodying the features of advantage enumerated as desirable and I wish it to be understood that while I have illustrated and described the preferred embodiment of the invention, I do not desire to be restricted to the exact details of construction shown and described as obvious modifications will suggest themselves to one skilled in the art, and I reserve the right to make all changes falling within the principle of construction of the appended claims, and in this construction it is desirable to state that this principle can be embodied to advantage in pulleys, gear wheels, and sprocket wheels adapted for starting and driving heavy machinery.

I claim:—

1. A spring wheel, comprising an inner member, an outer member, spokes pivotally attached at their outer ends to the outer member and fitting in the inner member for endwise slidable movement therein and oscillatory movement in the vertical plane of the circumference of the wheel, and provided with oppositely facing shoulders, and springs mounted on the spokes and engaging said shoulders and adapted at times to be compressed outwardly under endwise pressure imposed by the inner member of the wheel; said inner member having an interior recess in the radial plane of each spoke and each spoke having a spring pressed ball to ride into and out of the companion recess to prevent noise-producing contact between the inner member and spoke.

2. A spring wheel, comprising an inner member, an outer member, spokes pivotally attached at their outer ends to the outer member and fitting in the inner member for endwise slidable movement therein and oscillatory movement in the vertical plane of the circumference of the wheel, and provided with oppositely facing shoulders, and springs mounted on the spokes and engaging said shoulders and adapted at times to be compressed outwardly under endwise pressure imposed by the inner member of the wheel, said inner member having an interior recess in the radial plane of each spoke and each spoke having a transverse pocket, a spring therein, and a ball fitting in said pocket and engaging said spring and adapted to be projected into said recess when the latter and the pocket are alined.

3. A spring wheel, comprising an inner member having radial openings, which communicate at their inner ends or sides, the sides of the openings occupying the circumferential plane of the wheel converging outwardly, an outer member or rim surrounding the inner member, spokes pivoted at their outer ends to the outer member and provided at their inner ends with squared portions fitting in said openings of the inner member and capable of endwise and oscillatory movements therein, two or more adjacent spokes being adapted under extreme vertical movements of the inner member to engage at their inner ends, and coiled springs mounted on the spokes and exerting endwise pressure in opposite directions thereon, and adapted under sufficient movement of the inner member to be compressed in an outward direction by said inner member.

4. A spoke for a spring wheel having hub and tire members, said spoke comprising a member having two fixed and oppositely facing shoulders, a washer mounted slidingly on said spoke member and in engagement with one of said shoulders, and a spring mounted on said spoke member between said washer and the other of said shoulders, said spoke member having means for detachably securing one end thereof to the tire member, the other end of said spoke member being adapted to slidingly and detachably engage the hub member, said washer being adapted for engagement by the hub member to compress said spring.

5. A spring wheel comprising a hub member, a tire member provided with a series of sockets, a series of internally threaded socket pieces mounted in said sockets, a series of spokes each mounted slidingly at one end within the hub member and provided at its other end with a spherical head seated in one of said socket pieces, a tubular screw fitting around the outer end of each spoke and engaging the corresponding socket piece to secure the head of said spoke therein, and a jam nut for locking each of said tubular screws in position.

In testimony whereof I affix my signature, in the presence of two witnesses.

ROSWELL M. CLARK.

Witnesses:
HELEN C. RODGERS,
G. Y. THORPE.